No. 770,525. PATENTED SEPT. 20, 1904.
J. R. HUSSEY.
EXPANSION PIPE JOINT.
APPLICATION FILED JAN. 4, 1904.
NO MODEL.
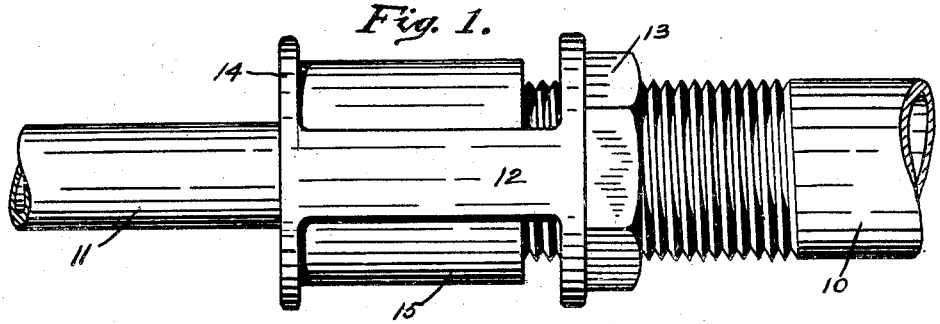
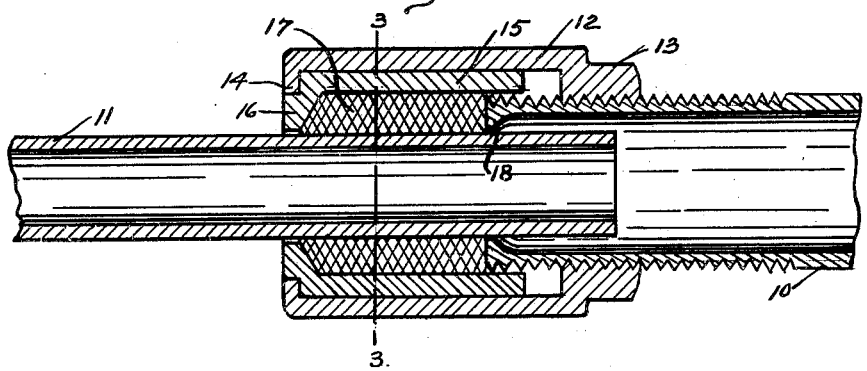
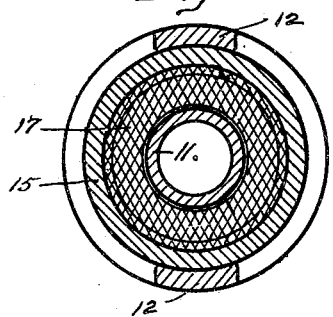
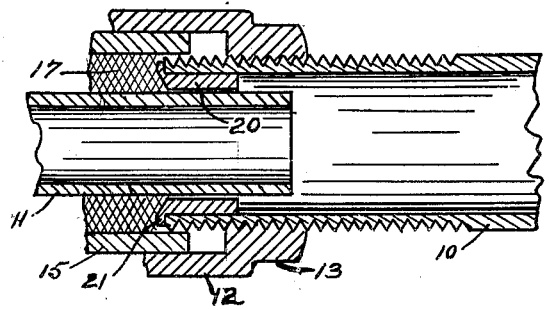
Witnesses
H. G. Stuart.
A. P. King.
Inventor
John R. Hussey
By V. H. Lockwood
Attorney No. 770,525.

Patented September 20, 1904.

UNITED STATES PATENT OFFICE.

JOHN R. HUSSEY, OF INDIANAPOLIS, INDIANA.

EXPANSION PIPE-JOINT.

SPECIFICATION forming part of Letters Patent No. 770,525, dated September 20, 1904.

Application filed January 4, 1904. Serial No. 187,665. (No model.)

*To all whom it may concern:*

Be it known that I, JOHN R. HUSSEY, of Indianapolis, county of Marion, and State of Indiana, have invented a certain new and useful Expansion Pipe-Joint; and I do hereby declare that the following is a full, clear, and exact description thereof, reference being had to the accompanying drawings, in which like numerals refer to like parts.

The object of this invention is to improve the construction of expansion pipe-joints.

This invention has been made with reference chiefly to steam-pipes used in dry-kilns; but it may be used elsewhere. Its simplicity, convenience, and novelty will appear from the accompanying drawings and the following description and claims.

Figure 1 is a plan view of the expansion-joint, the connected pipes being broken away. Fig. 2 is vertical central section of joint as it appears in Fig. 1. Fig. 3 is a transverse section of Fig. 2 on the line 3 3 of said figure. Fig. 4 is a central vertical section of the modified form.

In detail, 10 represents a heating-pipe that is externally threaded at the end.

11 is a smaller pipe adapted to fit within large pipe 10.

I provide a cage 12, consisting of two longitudinal bars with an annular head and nut 13 at one end, adapted to screw upon the threaded portion of the pipe 10. The other end of bars 12 are secured integrally with the ring 14 that is contracted somewhat or has an external diameter smaller than the distance from one of said bars 12 to the other, as appears in Fig. 2. A packing-sleeve 15 is provided that is somewhat shorter than said bars, and its external diameter is less than the space between the two bars 12, so that said packing-sleeve is insertible laterally into said cage. At one end said packing-sleeve is contracted, so that it fits snugly around the small pipe 11. It has also an annular groove to receive the ring 14 of the cage, so that there is an annular shoulder or end of the sleeve 15 that bears against the ring 14 of the cage, so that said ring on the cage prevents the endwise escape of the sleeve 15. The internal diameter of said packing-sleeve is substantially the same as the external diameter of the threaded portion of the pipe 10, so that said sleeve will fit snugly around the pipe 10 and prevent any packing getting into or on the threads. Suitable packing 17 is placed within the sleeve 15 and around small pipe 11. The inner end of the pipe 10 is swaged down at 18, so as to fit snugly around the small pipe 11.

The said joint is assembled as follows: The cage is first taken in hand and sleeve 15 is inserted in it from the side. Then the cage and sleeve are placed over the small pipe 11 and the packing put in said sleeve around the small pipe. The cage is then screwed on to the large pipe, and as this is screwed up the packing will be compressed within the sleeve 15 and between end 16 of said sleeve and the end 18 of the large pipe 10, so that it will hug the pipe 11 very tightly and make a close steam-tight joint. It is obvious that the pipe 11 may freely move through the packing and surrounding parts under the expansive influence of steam.

The modified form of Fig. 4 differs from the other form in the fact that the end of the pipe 10 is not changed; but there is inserted a band 20, that fits snugly within the pipe 10 and around the pipe 11 and has an upwardly-extending annular flange 21 on its inner end, against which the end of the piping bears and which is inclined to force the packing down against the pipe 11. This band 20 is to prevent the packing from being pressed between the pipes 10 and 11.

When the external diameter of the pipe 11 is substantially the same or slightly less than the internal diameter of the pipe 10, the end of the latter pipe need not be swaged down, as shown in Fig. 2, nor is the band 20 necessary.

What I claim as my invention, and desire to secure by Letters Patent, is—

1. The combination of an externally-threaded pipe, a small pipe fitting slidably within the large pipe, a cage adapted at one end to screw on the large pipe and at the other end having an inwardly-projecting portion, a packing-sleeve adapted to fit in said cage loosely and to be held by the inwardly-projecting portion of said cage from escape while under pressure and at each end fitting snugly around said pipes and packing within said sleeve and around the small pipe.

2. The combination of an externally-threaded pipe, a small pipe fitting slidably within said pipe, a cage formed of two parallel bars with a nut portion secured to one end of said bars that screws on the said threaded pipe and a ring secured to the other end of said bars, with an external diameter less than the distance between said bars, a packing-sleeve shorter than said bars and with an external diameter slightly less than the distance between the bars, so that it can be inserted from the side into said cage between said bars, said sleeve at each end fitting snugly around said pipes and packing within the sleeve and around the small pipe.

3. The combination of an externally-threaded pipe with its end swaged down to a diameter less than the normal diameter of the pipe, a small pipe fitting slidably and snugly within the contracted end of said large pipe, a cage adapted at one end to screw on said threaded pipe and having an inward projection at the other end thereof, a packing-sleeve within said cage that is prevented from escape while under pressure by the inward projection of the cage and at each end fitting snugly around said pipes, and packing within said sleeve and around the small pipe.

In witness whereof I have hereunto affixed my signature in the presence of the witnesses herein named.

JOHN R. HUSSEY.

Witnesses:
V. H. LOCKWOOD,
NELLIE ALLEMONG.